United States Patent [19]
Peake et al.

[11] 3,802,535
[45] Apr. 9, 1974

[54] ACOUSTIC NOISE EXPOSURE METER

[75] Inventors: Ernest R. Peake; Orrin H. Grangaard, both of St. Paul, Minn.

[73] Assignee: Tracoustics, Inc., Arvada, Colo.

[22] Filed: Mar. 24, 1972

[21] Appl. No.: 237,708

[52] U.S. Cl. ............................................. 181/.5 AP
[51] Int. Cl. ........................................... G01h 5/00
[58] Field of Search ................. 179/1 N; 181/.5 AP; 307/260; 328/150, 26; 324/119, 77 A

[56] References Cited
UNITED STATES PATENTS

| | | | |
|---|---|---|---|
| 3,346,694 | 10/1967 | Brady | 181/.5 AP |
| 3,615,162 | 10/1971 | Barber | 181/.5 AP |
| 3,089,561 | 5/1963 | Michael | 179/1 N |
| 2,590,460 | 3/1952 | Rackey | 181/.5 AP |
| 3,290,592 | 12/1966 | Pharo | 181/.5 R |
| 3,280,937 | 10/1966 | Faber | 181/.5 AP |

OTHER PUBLICATIONS

Glietsch, "A Computerized Aircraft Noise Monitoring System," 5/1970, pp. 288–293, Proceedings of the 16th International Aerospace Instrumentation Symposium.

*Primary Examiner*—Kathleen H. Claffy
*Assistant Examiner*—Jon Bradford Leaheey
*Attorney, Agent, or Firm*—Merchant, Gould, Smith & Edell

[57] ABSTRACT

An improved acoustic noise exposure meter for measuring acoustic noise intensity above a predetermined intensity threshold, and for visually displaying an accumulated representation of the measured noise. A miniature, battery-operated personal integrating noise dosimeter is carried on a person exposed to acoustic noise. The dosimeter receives and converts acoustic noise to a DC signal directly proportional to the noise intensity. The DC signal controls a voltage controlled oscillator to produce a variable pulse signal whose frequency varies directly with the DC signal. A counter accumulates a binary pulse count of the variable pulse signal that is representative of the total noise to which a person has been exposed. A read/calibrate structure, to which the dosimeter may be detachably coupled, receives and transforms the binary count to a binary coded decimal count an provides a visual readout of the binary coded decimal count. The accumulated dosimeter binary count is transferred to and is visually displayed as a percentage of total permissible noise exposure by the read/calibrate structure when the dosimeter and read/calibrate structures are connected. A calibration checking circuit within the read/calibrate structure provides an acoustic signal of predetermined sound intensity and duration for checking the dosimeter calibration. An overexposure detection circuit of the dosimeter provides an overexposure signal, which is visually displayed by the read-calibrate structure, if a noise overexposure occurs during a noise measurement test period.

2 Claims, 5 Drawing Figures

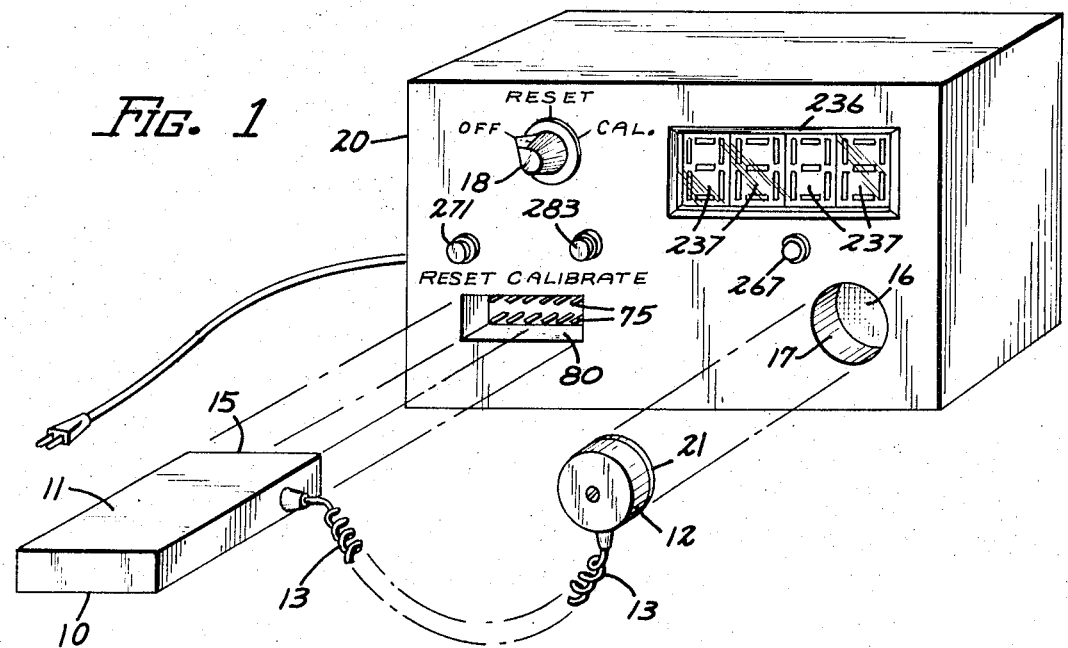
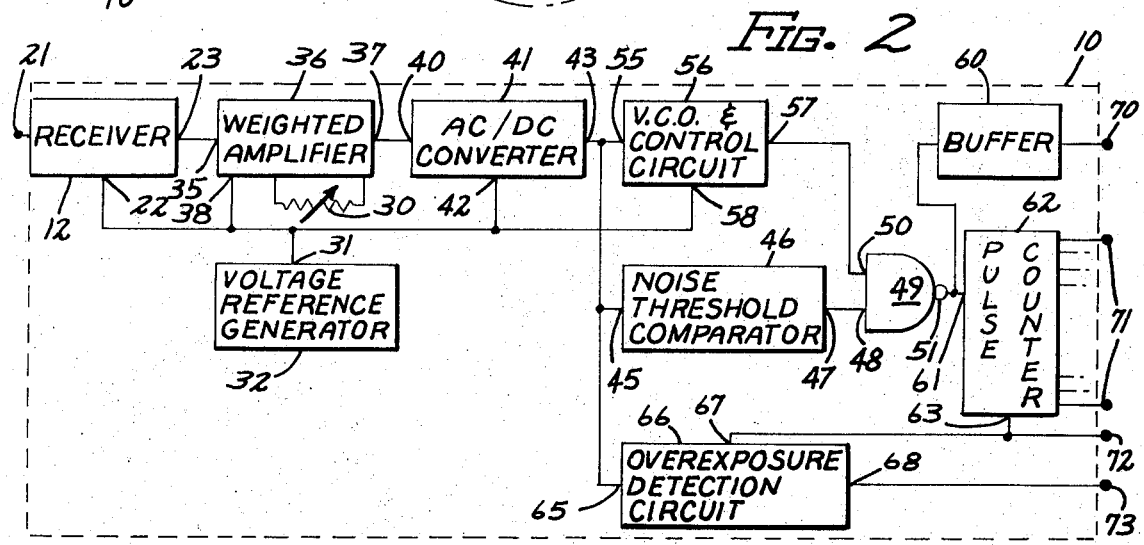
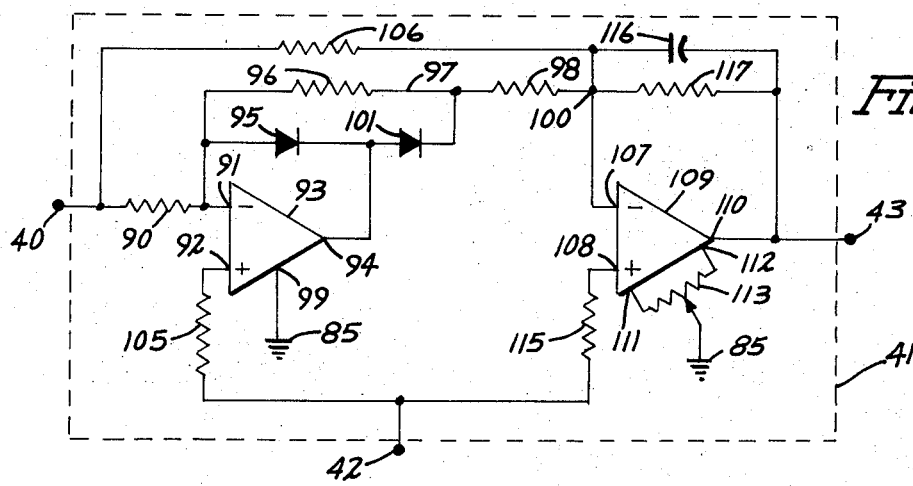

ACOUSTIC NOISE EXPOSURE METER

DEFINITIONS

The meanings of the words as below defined will apply throughout the following discussion:
a. sound intensity — is the sound pressure level measured in decibels.
b. decibels (dB) — is a unit of measure equal to twenty times the logarithm to the base ten of a ratio of the pressure of the measured sound to a predetermined reference pressure of 0.0002 microbar.
c. noise — is a sound intensity of greater than or equal to ninety dB.
d. dBA — is a noise level in decibels as measured with the A-weighted network (described later) of a standard sound level meter using slow response.
e. noise exposure — is a period of time during which the noise level is ninety or more dBA.
f. noise level — is the average dBA during a noise exposure.
g. multiple noise exposure - is the daily noise exposure composed of two or more different noise levels.

BACKGROUND OF THE INVENTION

This invention pertains generally to acoustic sound intensity measurement, and more paritcularly to the measurement of acoustic noise. In measuring that noise which may be harmful to a human ear, it becomes necessary to measure and to analyze three basic parameters during a noise exposure of a person: the noise intensity, the length of exposure to a particular noise intensity, and the frequency in hertz of the particular noise intensity. An acoustic noise measurement device, that complies with Federal noise measurement standards, must measure all of the above-stated parameters and present the combined measurement in a meaningful manner.

In an era where concern for environmental pollution of all forms is being expressed, the need for accurate measurement of acoustic noise has presented a critical problem. In 1969, Federal legislation in the form of Section 50–204.10 of the Walsh-Healey Public Contracts Act provided, for the first time, noise limits beyond which manufacturers were compelled to initiate positive action to protect their employees' hearing. The Walsh-Healey Act placed rigid restrictions upon the maximum exposure time that an employee could be subjected to particular noise levels. Recent follow-up legislation in the form of the Occupational Safety and Health Act of 1970 has given continued impetus to the Walsh-Healey Act by providing an organization to administer and enforce the standards set forth.

Determining that acoustic sound which is harmful to the human ear has been the subject of extensive research within the past decade. Early research and the operation of sound measuring devices were founded on the theory that the aboslute sound intensity to which a person was exposed determined the extent of damage to his hearing. Modern acoustic noise measuring devices are based on recent research findings that damage to the human ear depends upon a functional relationship among noise intensity, frequency of the noise, and the time of exposure to the noise. Although not a linear relationship, in general, longer exposure to high intensity noise is permitted at lower frequencies than would be permitted at higher frequencies; and shorter exposure to noise of high intensity is permitted than to noise of lower intensity. Since acoustic noise typically received by a person during an 8 hour working day is a continuously varying composition of frequencies and noise intensity, it is necessary for an acoustic noise measurement device to weight the measured noise according to its frequency and to integrate this noise level over a given period of time. Further, since typical daily noise exposure is composed of two or more different noise levels (multiple noise exposure) the acoustic noise measurement device must average the multiple noise exposure over a period of time and indicate the resultant measurement in a meaningful manner.

Measurement of accumulative noise to which an individual is exposed, requires that the noise measuring device be portable and adapted to be carried or worn by the individual on whom the noise exposure measurement is being performed. The measuring device should further have noise receiving means that can be placed in reasonably close proximity to the test subject's ears. In addition to portability, the noise measuring device must satisfy the stringent accuracy requirements of the Walsh-Healey Act, and must satisfy these requirements without excessive size. Further, the noise measuring device should be easy to operate by a non-skilled person having little training in its operation.

The permissible noise exposures permitted by an individual over a normal 8 hour working day, as defined by the Walsh-Healey Act, are given in Table I. When an individual is exposed to multiple noise exposure during a working day, the combined effect of the various noise levels to which he is exposed must be considered. The combined effect of the various noise levels is determined as a percentage of the maximum exposure allowed by summing the fractions obtained by dividing the total time a person is exposed to a particular noise level by the maximum allowable time at that level. This relationship is expressed by Equation 1, where $E$ is the combined multiple $$E = (C_1/T_1 + C_2/T_2 + ... + C_X/T_X) \times 100 \tag{1}$$

noise exposure of a person expressed as a percentage of the maximum (100 percent) allowable exposure, $C_X$ is the total time of exposure to a specified noise level $X$, and $T_X$ is the maximum total time of exposure permitted at level $X$. As an example, if during an 8 hour working day a person was exposed to 1 hour of noise level between 97 and 100 dBA, and to 1 hour of noise level between 92 and 95 dBA his total multiple noise exposure as a percentage of that permissible at the end of the day is calculated using Table I and Equation 1 as follows:

$$E = (½ + ¼) \times 100 = (0.50 + 0.25) \times 100 = 75\%$$

Table I indicates the noise level in terms of dBA. As previously defined, dBA is a measure of noise level in decibels when measured with a network having an "A" weighted frequency response. Table II gives sound level meter random incidence relative response levels as a

TABLE I

Permissible Noise Exposure Requirements of the Walsh-Healey Act

| Duration Per Day (Hours) | Noise Level (dBA) |
|---|---|
| 8 | 90 |
| 6 | 90-92 |
| 4 | 92-95 |
| 3 | 95-97 |
| 2 | 97-100 |
| 1.5 | 100-102 |
| 1.0 | 102-105 |
| 0.5 | 105-110 |
| 0.25 | 110-115 |
| none | >115 |

TABLE II

Sound Level Meter Random-Incidence Relative Response Level as a Function of Frequency for an "A" Weighted Network

| Frequency Hz | A Weighting Relative Response dB |
|---|---|
| 10 | −70.4 |
| 12.5 | −63.4 |
| 16 | −56.7 |
| 20 | −50.5 |
| 25 | −44.7 |
| 31.5 | −39.4 |
| 40 | −34.6 |
| 50 | −30.2 |
| 63 | −26.2 |
| 80 | −22.5 |
| 100 | −19.1 |
| 125 | −16.1 |
| 160 | −13.4 |
| 200 | −10.9 |
| 250 | −8.6 |
| 315 | −6.6 |
| 400 | −4.8 |
| 500 | −3.2 |
| 630 | −1.9 |
| 800 | −0.8 |
| 1,000 | 0 |
| 1,250 | +0.6 |
| 1,600 | +1.0 |
| 2,000 | +1.2 |
| 2,500 | +1.3 |
| 3,150 | +1.2 |
| 4,000 | +1.0 |
| 5,000 | +0.5 |
| 6,300 | −0.1 |
| 8,000 | −1.1 |
| 10,000 | −2.5 |
| 12,500 | −4.3 |
| 16,000 | −6.6 |
| 20,000 | −9.3 | function of frequency for an A weighted relative response, as defined by American National Standard S1.4-1971. Table III gives the total tolerance limits for sound at random incidence for a Type 2 sound level meter, as defined by American National Standard S1.4-1971. Therefore, to meet the American National Standard requirements for a Type 2, A weighted sound measuring device, the sound measuring meter must comply with the requirements of Table II and Table III.

Early prior art noise exposure meters were relatively bulky and would not satisfy the rigid accuracy requirements set forth by the Walsh-Healey Act. Since the noise exposure measuring devices were too large to be carried on a person, noise measurements were taken at discrete locations throughout an area typical of that in which a person would be exposed to noise during a period of time; the individual noise measurements were thereafter plotted on a noise intensity contour map

TABLE III

Total Tolerance Limits for Sound at Random Incidence for a Type 2 Sound Level Meter

| Frequency Hz | A Weighting dB |
|---|---|
| 20 | +5.0, − |
| 25 | +4.0, −4.5 |
| 31.5 | +3.5, −4.0 |
| 40 | +3.0, −3.5 |
| 50 | +3.0 |
| 63 | ±3.0 |
| 80 | ±3.0 |
| 100 | ±2.5 |
| 125 | ±2.5 |
| 160 | ±2.5 |
| 200 | ±2.5 |
| 250 | ±2.5 |
| 315 | ±2.0 |
| 400 | ±2.0 |
| 500 | ±2.0 |
| 630 | ±2.0 |
| 800 | ±1.5 |
| 1,000 | ±2.0 |
| 1,250 | ±2.0 |
| 1,600 | ±2.5 |
| 2,000 | ±3.0 |
| 2,500 | ±4.0, −3.5 |
| 3,150 | +5.0, −4.0 |
| 4,000 | +5.5, −4.5 |
| 5,000 | +6.0, −5.0 |
| 6,300 | +6.5, −5.5 |
| 8,000 | +6.5, −6.5 |
| 10,000 | +6.5, −0 | which indicated the measured noise contours through the area. The noise level to which a person moving within or between the specific areas was exposed was, therefore, indeterminable.

One type of sound measurement device typical of the prior art measured the time of exposure to various predetermined sound intensity ranges and recorded the total exposure time for each range by means of a plurality of electromechanical clocks. This type of sound measurement device did not provide for frequency discrimination of the measured sound intensity or for measurement of sound intensities outside of the predetermined ranges; and the timed measurements were grossly inaccurate relative to the Walsh-Healey Act requirements, due to the inaccuracy of the electormechanical clocks.

Another early prior art sound measurement device provided for converting the measured sound intensity to a pulse frequency that varied with the measured sound intensity and, thereafter, counted the number of pulses produced. This device constructed with vacuum tubes, used a reactance tube to vary the oscillation frequency of a first oscillator according to the measured noise intensity, beat the output signal of the first oscillator against the output signal of a second fixed frequency oscillator, and counted the beat notes produced by summing the output signals from the two oscillators. This device provides an accumulated count representative of the total measured sound intensity, but does not discriminate among varied frequencies of the measured sound intensity, and suffers from the high sensitivity of the reactance tube to temperature, heat, and age. Further, this sound measurement device is a bulky instrument not suitable for portability with or attachment to an individual.

Later prior art in noise exposure measurement recognized the need for portability of the measuring device with a person. Accordingly, noise measuring devices were designed to be attached to a person or to be hand-held. These noise exposure measurement devices typically did not discriminate between either various noise levels or various frequencies of the measure noise intensity. The noise measured by these devices was either continually integrated and displayed by means of an electromechanical integrator readout device or was instantaneously displayed by means of a voltmeter. These measurement devices, while featuring portability, would not meet the Walsh-Healey accuracy requirements. Further, the electromechanical readout devices required replacement after each noise measurement test and were not susceptible to instantaneous readout. The voltmeter readout devices were generally hand-held devices that did not provide an accumulated indication of the measured noise but, rather, provided for instantaneous measurement of the noise intensity at a given time and location.

The present invention provides a miniaturized, inexpensive and highly accurate device for measuring the acoustic noise to which a person is exposed over a period of time, and for detachably displaying the accumulated noise measurement as a percentage of the permissible multiple noise exposure in compliance with the requirements of the Walsh-Healey Act and of the 1970 Occupational Safety and Health Act. While the present invention will be described in conjunction with its use as a noise exposure meter, it will be understood that the invention is not limited to this use and can be used for measuring any acoustic sound accumulation over a period of time.

SUMMARY OF THE INVENTION

A battery operated personal integrating noise dosimeter measures the acoustic sound intensity to which an individual is exposed over a period of time and automatically accmulates a representation of the total acoustic sound intensity measured as a percentage of a predetermined total permissible multiple noise exposure. A dosimeter receiver, designed to be placed in close proximity with the test individual's ear receives acoustic sound intensity and converts it to an electrical signal proportional to the sound intensity. The electrical signal is fed to an amplifier whose relative output response is frequency weighted by an A weighted scale, as previously defined, which produces a weighted output AC signal directly proportional to the sound intensity. The weighted AC signal passes to an AC to DC converter that provides a DC signal which varies in direct proportion with the weighted AC signal. The DC signal controls the output pulse frequency of a voltage controlled pulse oscillator such that the frequency of the oscillator is directly proportional to the sound intensity variation. The output pulse signal of the oscillator is coupled through a gating circuit to a binary pulse counter. A threshold detection circuit provides an enable signal to the gating means, thereby allowing the gating means to pass the pulse signal whenever the measured sound intensity exceeds the noise threshold, as previously defined. The binary pulse counter continues to accumulate a binary count of the received pulses until reset.

An overexposure threshold detection circuit in the dosimeter provides an overexposure output signal whenever the measured noise exceeds a predetermined overexposure threshold level for a given period of time. The overexposure threshold detection circuit continues to produce the overexposure signal until reset.

A read/calibrate structure detachably connected to the dosimeter provides a decimal visual display of the accumulated dosimeter pulse count represented as a percentage of the total multiple noise exposure permitted. A light emitting diode on the read/calibrate structure provides an overexposure warning in response to the overexposure output signal from the dosimeter. Upon connecting the dosimeter to the read/calibrate structure, the accumulated binary pulse count of the dosimeter counter is transferred to the read/calibrate structure and is transformed into a decimal visual display. Simultaneously, an overexposure signal, if produced by the overexposure threshold detection count, is transferred to and activates the overexposure warning indicator of the read/calibrate structure. Upon connection for display of the dosimeter accumulated count, the dosimeter may be reset for another noise measurement test or may continue accumulating noise intensity measurements on its previous test. A single read/calibrate structure is intended to provide a display readout means for a plurality of dosimeter structure. The read/calibrate device also provides an acoustic signal of predetermined sound intensity and duration for checking the calibration of a dosimeter.

It is one object of the present invention, therefore, to provide an improved acoustic sound measuring apparatus.

It is another object of the present invention to provide an improved acoustic noise exposure meter wherein a visual indication of the accumulated measured noise is displayed detachably from the noise measuring structure.

It is a further object of the present invention to provide an acoustic noise exposure meter wherein the noise measuring structure is miniaturized for ease of portability with a person by attachment to his belt or insertion in his pocket.

It is a further object of the present invention to provide an acoustic noise exposure meter having a noise measuring structure with improved means for converting a weighted AC signal, representative of the measured sound intensity, to a pulse signal whose frequency varies directly with the measured sound intensity.

It is a further object of the present invention to provide an acoustic noise exposure meter having means for checking the calibration of the noise measuring structure as an integral part of a detachable visual display readout device.

These and other objects of my invention will become apparent to those skilled in the art upon consideration of the accompanying specification, claims, and drawings.

BRIEF DESCRIPTION OF THE DRAWINGS

Referring to the drawings, wherein like numerals represent like parts throughout the several views;

FIG. 1 is a diagrammatic perspective view of the acoustic noise exposure meter of the present invention;

FIG. 2 is a diagrammatic representation of the functional blocks of the personal integrating noise dosimeter portion of the acoustic noise exposure meter disclosed in FIg. 1;

FIG. 3 is a schematic representation of the AC to DC converter circuit of the personal integrating noise dosimeter disclosed in FIG. 2;

DESCRIPTION OF THE PREFERRED EMBODIMENT

Figure 4:
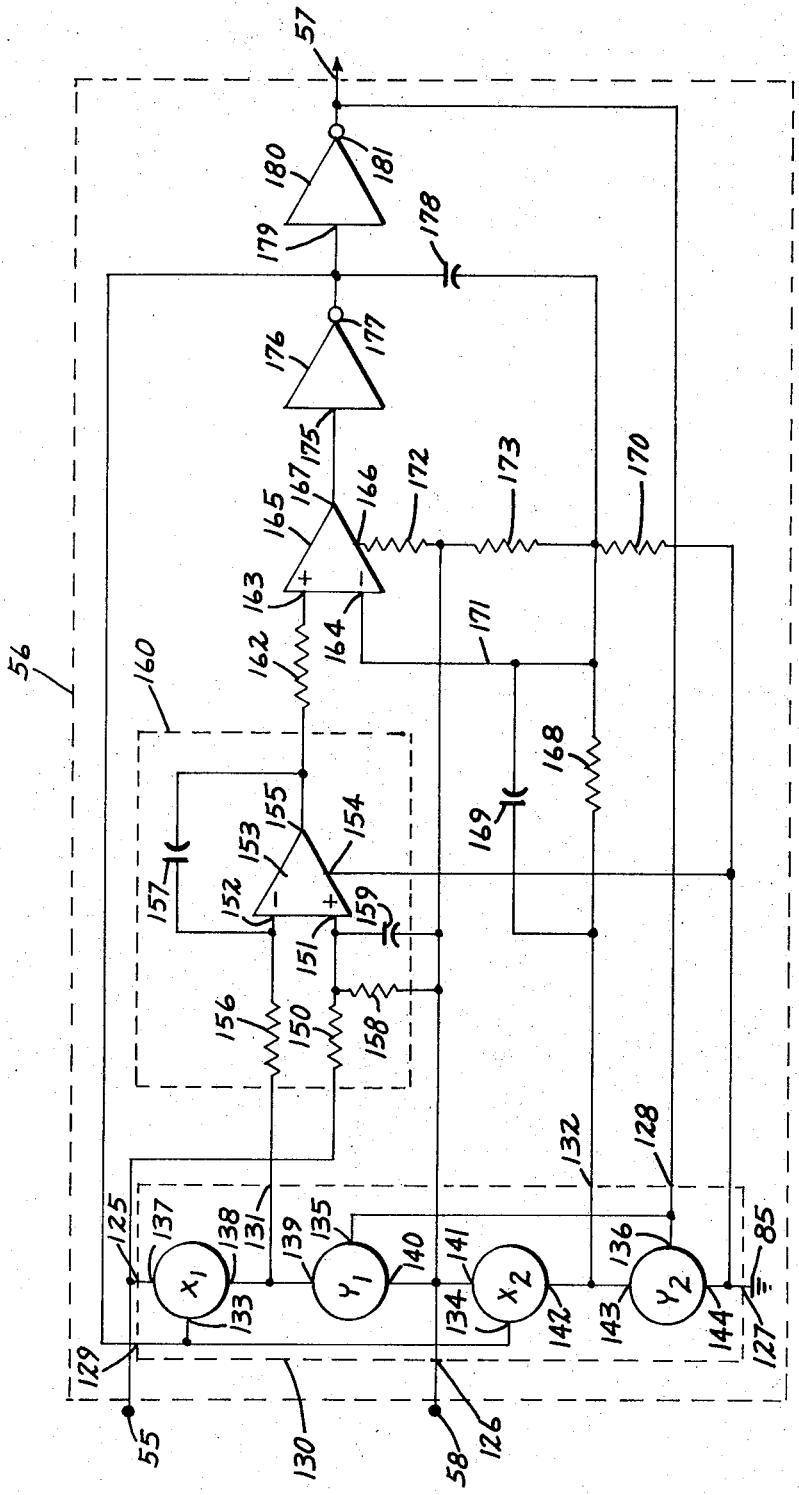
FIG. 4 is a schematic representation of the voltage controlled oscillator and control circuit portion of the personal integrating noise dosimeter disclosed in FIG. 2.

Referring to the drawings there is generally shown, in FIG. 1, a personal integrating noise dosimeter structure (PIND) 10 and a read/calibrate structure 20. The PIND structure 10 comprises a PIND housing 11 and a receiver 12 connected to the PIND housing 11 by a flexible cable 13. The PIND 10 is miniaturized for ease of attachment to a person's belt or for insertion in his pocket. The flexible cable 13 is of sufficient length to allow the receiver 12 to be worn in the vicinity of a user's ear.

The PIND 10 is shown in block diagram form in FIG. 2. As can be seen from FIG. 2, receiver 12 has a microphone input 21, a reference input 22, and a signal output 23. Microphone input 21 forms a front surface of receiver 12 as shown in FIG. 1. Reference input 22 of receiver 12 is directly connected to an output 31 of a voltage reference generator 32. Signal output 23 of receiver 12 is connected to a signal input 35 of a weighted amplifier 36. Weighted amplifier 36 further has a reference input 38 and a signal output 37. Weighted amplifier 36 is a variable gain AC amplifier designed to produce an A weighted frequency response, as previously described and contains a variable resistor 30 for calibrating the amplifier gain. Reference input 38 of weighted amplifier 36 is directly connected to the output 31 of voltage reference generator 32. Signal output 37 of weighted amplifier 36 is connected to a signal input 40 of an AC to DC converter 41. AC to DC converter 41 further has a reference input 42 and a DC output 43.

Reference input 42 of AC to DC converter 41 is directly connected to output 31 of voltage reference generator 32. The DC output 43 of AC to DC converter 41 is connected to an input 45 of a noise threshold comparator 46. Noise threshold comparator 46 further has an output 47 connected to a first input 48 of a NAND gate 49. Gate 49 further has a second input 50 and an output 51.

DC output 43 of AC to DC converter 41 is further connected to a DC input 55 of a voltage controlled oscillator and control circuit (VCO) 56. VCO 56 further has a reference input 58 and a pulse signal output 57. Reference input 58 is directly connected to output 31 of voltage reference generator 32.

Output 57 of VCO 56 is directly connected to the second input 50 of gate 49. Output 51 of gate 49 is connected by means of a buffer circuit 60 to a sync frequency output 70 of PIND structure 10 and is further directly connected to a pulse input 61 of a pulse counter 62. Pulse counter 62 further has a reset input 63 and a plurality of accumulated binary count outputs 71.

DC output 43 of AC to DC converter 41 is further connected to an input 65 of an overexposure detection circuit 66. Overexposure detection circuit 66 further has a reset input 67 and an output 68. Reset input 67 is directly connected to reset input 63 of pulse counter 62 and to a reset input 72 of PIND 10. Output 68 of overexposure detection circuit 66 is directly connected to an overexposure signal output 73 of PIND 10.

AC to DC converter 41 is shown in schematic form in FIG. 3. As can be seen from FIG. 3, the signal input 40 is connected by means of a resistor 90 to an inverting input 91 of an operational amplifier 93. Operational amplifier 93 further has a non-inverting input 92, a common input 99, and an output 94. Common input 99 is directly connected to a ground 85. Input 91 of amplifier 93 is further connected by means of a diode 95 to the output 94 of amplifier 93, and by means of a resistor 96, in series with a conductor 97 and a resistor 98 to a summing junction 100. Output 94 of amplifier 93 is also connected by means of a diode 101 to conductor 97. Non-inverting input 92 of operational amplifier 93 is connected by means of a resistor 105 to the reference input 42 of AC to DC converter 41.

Signal input 40 of AC to DC converter 41 is further connected by means of a resistor 106 to summing junction 100. Summing junction 100 is directly connected to an inverting input 107 of an operational amplifier 109. Operational amplifier 109 further has a non-inverting input 108, a pair of nulling inputs 111 and 112, and a signal output 110. A zero calibration potentiometer 113 is connected between the nulling inputs 111 and 112. Potentiometer 113 further has a wiper 114 connected directly to ground 85. Non-inverting input 108 of amplifier 109 is connected by means of a resistor 115 to the reference input 42 of the AC to DC converter 41.

Summing junction 100 is further connected by means of a capacitor 116 in parallel with a resistor 117 to the output 110 of amplifier 109.

Output 110 of operational amplifier 109 is connected to the DC output 43 of AC to DC converter 41.

The voltage controlled oscillator and control circuit (VCO) 56 of the PIND 10 is shown in schematic form in FIG. 4. As can be seen from FIG. 4, DC input 55 of VCO 56 is connected to a signal input 125 of a bilateral switch 130. Bilateral switch 130 further has a reference input 126, a ground input 127, a Y enable input 128, an X enable input 129, a first output 131, and a second output 132. Ground input 127 of switch 130 is connected to ground 85. Reference input 126 of switch 130 is directly connected to reference input 58 of VCO 56. Bilateral switch 130 is diagrammatically represented in FIG. 4 by two pairs of electronic switches labeled X1, X2, and Y1, Y2. Switches X1 and X2 have an enable input 133 and 134, respectively, each of which is directly connected to X enable input 129 of bilateral switch 130. Similarly, switches Y1 and Y2 have an enable input 135 and 136, respectively, each of which is directly connected to Y enable input 128 of bilateral switch 130. Switch X1 further has an input 137 and an output 138. Input 137 of switch X1 is connected to signal input 125 of bilateral switch 130, while output 138 is connected to an output 139 of switch Y1 and to first output 131 of bilateral switch 130. Switch Y1 further has an input 140 directly connected to reference input 126 of bilateral switch 130 and to an input 141 of switch X2. Switch X2 has an output 142 connected to an input 143 of switch Y2 and to second output 132 of bilateral switch 130. Switch Y2 further has an output 144 connected directly to ground input 127 of bilateral switch 130.

In the preferred embodiment, a Complementary MOS gating circuit performs the bilateral switching functions of bilateral switch 130.

DC input 55 of VCO 56 is further connected by means of a resistor 150 to a non-inverting input 151 of an operational amplifier 153. Amplifier 153 further has an inverting input 152, a common input 154 and an output 155. Inverting input 152 of amplifier 153 is connected by means of a resistor 156 to the first output 131 of bilateral switch 130 and by means of a capacitor 157 to the output 155 of amplifier 153. Non-inverting input 151 of amplifier 153 is connected by means of a resistor 158 in parallel with a capacitor 159 to the reference input 58 of VCO 56. Common input 154 of amplifier 153 is directly connected to ground 85. The operational amplifier 153, capacitors 157 and 159, and resistors 150, 156 and 158, form a ramp generator 160.

Output 155 of operational amplifier 153 is connected by means of a resistor 162 to a non-inverting input 163 of a comparator amplifier 165. Comparator amplifier 165 further has an inverting input 164, a common input 166, and an output 167.

Inverting input 164 of comparator amplifier 165 is connected by means of a resistor 170 to ground 85, and by means of a resistor 168 in parallel with a capacitor 169 to the second output 132 of bilateral switch 130.

Reference input 58 of VCO 56 is connected by means of a resistor 172 to the common input 166 of comparator amplifier 165, and by means of a resistor 173 to the input 164 of amplifier 165.

Output 167 of comparator 165 is connected to an input 175 of an inverter 176. Inverter 176 also has an output 177 which is connected by means of a capacitor 178 to the input 164 of amplifier 165. Output 177 of inverter 176 is also connected to the X enable input 129 of bilateral switch 130, and to an input 179 of an inverter 180. Inverter 180 further has an output 181 which is connected to the Y enable input 128 of bilateral switch 130, and to the pulse signal output 57 of VCO 56.

Figure 5:
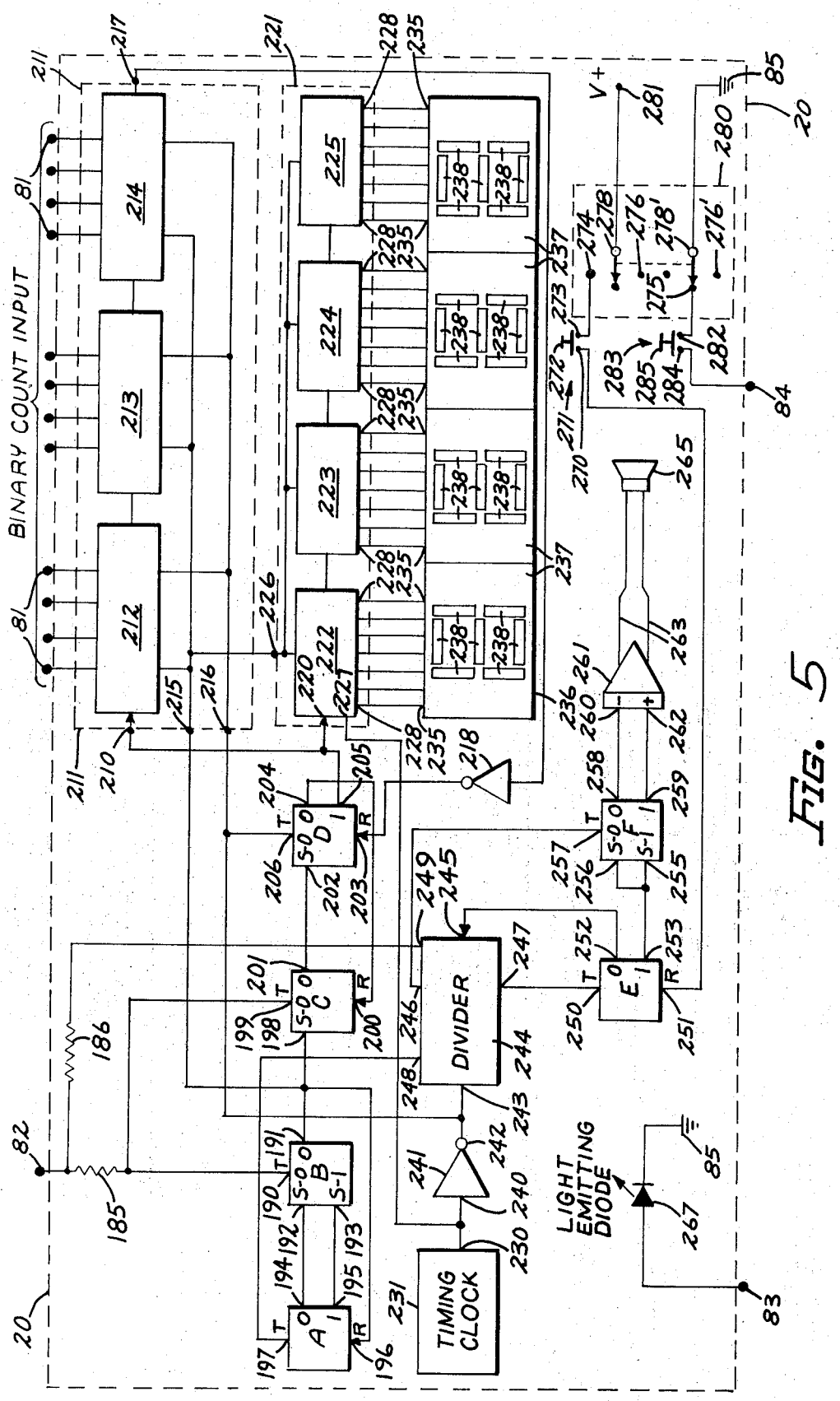
FIG. 5 is a diagrammatic representation of the functional blocks of the read/calibrate portion of the acoustic noise exposure meter disclosed in FIG. 1.

A block diagram of the read/calibrate structure 20 is illustrated in FIG. 5. In FIG. 5 there is shown a plurality of J-K flip-flops A, B, C and D. Each of the flip-flops have a toggle input T, a reset input R, binary zero and one outputs designated as "0" and "1", respectively, and set inputs for the binary zero and one states, designated as "S-0" and "S-1", respectively. A toggle input 190 of flip-flop B is connected by means of a multiplexer resistor 185 to a sync frequency input 82 of read/calibrate structure 20. Flip-flop B further has a zero set input 192, a one set input 193, and a binary zero output 191. Zero set input 192 is connected to a binary zero output 194 of flip-flop A. Flip-flop A further has a reset input 196, a toggle input 197, and a binary one output 195. Binary one output 196 of flip-flop A is connected to the set one input 193 of flip-flop B.

The binary zero output 191 of flip-flop B is directly connected to the reset input 196 of flip-flop A and further is connected to a zero input 198 of flip-flop C. Flip-flop C further has a toggle input 199, a reset input 200, and a binary zero output 201. Toggle input 199 of flip-flop C is connected to the toggle input 190 of flip-flop B. Binary zero output 201 of flip-flop C is connected to a set zero input 202 of the flip-flop D. Flip-flop D further has a reset input 203, a binary zero output 204, a binary one output 205, and a toggle input 206. Binary zero output 204 of flip-flop D is connected to the reset input 200 of flip-flop C. Binary one output 205 of flip-flop D is connected to a clock inhibit input 210 of a temporary pulse storage circuit 211. In the preferred embodiment temporary pulse storage circuit 211 comprises a plurality of serially connected binary counters 212, 213 and 214. Temporary pulse storage circuit 211 further has a preset enable input 215, a clock input 216, a carry over command output 217 and a plurality of binary count inputs 81. The preset enable input 215 of temporary pulse storage circuit 211 is connected to the binary zero output 191 of flip-flp B, while the clock input 216 is connected to the toggle input 206 of flip-flop D. The carry over command output 217 of temporary pulse storage circuit 211 is connected by means of an inverter 218 to the reset input 203 of flip-flop D.

Binary one output 205 of flip-flop D is further connected to a clock enable input 220 of a binary coded decimal counter 211. In the preferred embodiment, binary coded decimal counter 221 comprises a plurality of binary coded decimal counting stages 222, 223, 224 and 225. The number of binary coded decimal counter stages required in a particular design is a function of the number of the digital characters to be represented in a visual readout. Binary coded decimal counter 221 further has a reset input 226, a clock input 227 and a plurality of binary coded decimal outputs 228. Reset input 226 of binary coded decimal counter 221 is connected to the binary zero output 191 of flip-flop B. Clock input 227 of binary coded decimal counter 221 is connected to an output 230 of a timing clock 231.

The plurality of binary coded decimal outputs 228 are connected to a plurality of binary coded decimal inputs 235 of a digital display panel 236. In the preferred embodiment, the digital readout of visual display panel 236 is provided by four digital Numitron displays 237 each having seven illuminating display segments 238.

Output 230 of timing clock 231 is further connected to an input 240 of an inverter 241. Inverter 241 further has an output 242 connected to a clock input 243 of a divider circuit 244 and is also connected to the toggle input 206 of flip-flop D. Divider circuit 244 further has a reset input 245, a first output 246, a second output 247, a third output 248, and a fourth output 249. Fourth output 249 is connected by means of a multiplex resistor 186 to the sync frequency input 82 of the read/calibrate strucutre 20. Third output 248 of divider circuit 244 is connected to toggle input 197 of flip-flop A. Second output 247 of divider circuit 244 is connected to a toggle input 250 of J-L flip-flop E. Flip-flop E further has a reset input 251, a binary zero output 252, and a binary one output 253. Binary zero output 252 of flip-flop E is connected to the reset input 245 of divider circuit 244, while binary one output 253 of flip-flop E is connected to a set one input 255 and to a set zero input 256, both of a flip-flop F. Flip-flop F further has a toggle input 257, a binary zero output 258, and a binary one output 259.

Toggle input 257 of flip-flop F is connected to the first output 246 of divider circuit 244. The binary zero output 258 of flip-flop F is connected to an inverting input 260 of an integrator 261. Integrator 261 further has a non-inverting input 262 and outputs 263. Binary one output 259 of flip-flop F is connected to non-inverting input 262 of integrator 261. Outputs 263 of integrator 261 are directly connected to a speaker 265. Speaker 265 forms an enclosed wall 16 of a recessed cavity 17 of the read/calibrate structure 20 (FIg. 1). Recessed cavity 17 is shaped so as to permit insertion of the receiver 12 of the PIND 10 into the cavity such that the microphone input 21 of the receiver 12 is placed in the close proximity with the speaker 265 of the read/calibrate structure 20.

An overexposure signal input 83 is connected by means of a light emitting diode 267 to ground 85.

Reset input 251 flip-flop E is connected to a stationary contact 270 of a calibrate push button switch 271. Calibrate push button switch 271 further has a movable contact 272 and a stationary contact 273. Stationary contact 273 of calibrate push button switch 271 is connected to a first stationary contact 274 of a two layer wafer selector switch 280. Selector switch 280 further has a second stationary contact 275, a pair of third stationary contacts 276 and 276', a pair of movable contacts 278 and 278' and an indicator knob 18, FIG. 1. Movable contact 278 of selector switch 280 is connected to a voltage bias 281; movable contact 278' of selector switch 280 is connected to ground 85. Stationary contact 275 of selector switch 280 is connected to a stationary contact 282 of a reset push button switch 283. Reset push button switch 283 further has a stationary contact 284 and a movable contact 285. Stationary contact 284 of reset push button switch 283 is connected to a reset output 84 of read/calibrate structure 20. Movable contacts 278 and 278' of selector switch 280 are positioned in their respective switch layers so as to make contact with stationary contacts 274, 275 and 276 (276') (FIG. 5) when the selector switch indicator knob 18 respectively points to the CALIBRATE, RESET and OFF positions (FIG. 1).

Sync frequency output 70, accumulated binary count outputs 71 of pulse counter 62, reset output 72 and the overexposure signal output 73 are connected to isolated female terminals of a connector, not shown, but formed in the PIND hosuing face 15 of PIND housing 11, FIG. 1. Male connector 75 forms the enclosed end of a recessed cavity 80 of the read/calibrate structure 20 and is designed to mate with the cooperating female connector formed in the PIND housing face 15 when the PIND housing face 15 is inserted in the recessed cavity 80. Individual terminals of male connector 75 and the cooperating female terminals of the connection formed in PIND housing 15 are physically arranged such that when mated, the accumulated binary count outputs 71, the sync frequency output 70, the overexposure signal output 73, and the reset input 72 of the PIND 10 (FIG. 2) are connected respectively to the binary count inputs 81, the sync frequency input 82, the overexposure signal input 83 and the reset output 84 of the read/calibrate structure 20 (FIG. 6).

OPERATION OF THE PREFERRED EMBODIMENT

In normal operation the PIND 10 is carried by the person on whom a noise measurement test is to be made. The miniaturized PIND housing 11 is attached to the person's belt or is inserted into his pocket, and the flexible cable is is inserted into his pocket, and the flexible cable 13 is extended so that the receiver 12 is placed in the vicinity of the person's ear.

Acoustic noise is received by the microphone input 21 of receiver 12 which converts the acoustic sound signal into an electrical AC signal that varies in proportion to the received sound intensity. The AC signal is pre-amplified by a darlington amplifier to a functional level by the receiver 12; the preamplified AC signal is coupled into variable gain weighted amplifier 36 where it is amplified according to the A weighted frequency response, Tables II and III. Gain of the weighting amplifier 36 is adjustable by calibration resistor 30. Adjustment of the gain calibration resistor 30 and of the zero calibration resistor 113 are the only adjustments required for calibration of the PIND structure 10.

The A weighted amplified AC signal appearing at output 37 of weighted amplifier 36 passes to the AC to DC converter 41 wherein a signal conversion takes place as hereinafter described.

Referring to FIG. 3, a positive waveform of an AC signal applied to input 40 of the AC TO DC converter 41 causes diodes 95 and 101 to conduct through resistor 90, thereby holding conductor 97 at the virtual ground input level of amplifier 93 and subsequently presenting a zero input level to the input resistor 98 of amplifier 109. The positive signal applied to input 40, however, is also applied to the inverting input 107 of amplifier 109 through the input resistor 106 and is thereby amplified by amplifier 109, in combination with its input resistor 106, its feedback resistor 117 and its feedback capacitor 116. The amplifier gain is determined by the ratio of the feedback resistor 117 over the input resistor 106. The feedback capacitor 116 functions to integrate the signal applied to the summing junction 100.

A negative AC waveform applied to input 40 of AC to DC converter 41 is also applied through resistors 90 and 106, respectively, to inverting input 91 of operational amplifier 93 and to summing junction 100. The negative AC waveform appearing at inverting input 91 of operational amplifier 93 causes diode 95 to be reverse biased and, therefore, allows operational amplifier 93 to amplify and to invert the negative waveform. The gain of operational amplifier 93 will be the ratio of resistor 96 over resistor 90. The diode 101, however, will be forward biased and the amplified inverted negative waveform will be applied through resistor 98 to summing junction 100 where it will be further amplified and inverted by operational amplifier 109 with a gain determined by the ratio of resistor 117 to resistor 98. A negative AC waveform appearing at input 40 of AC to DC converter 41 will also be applied to summing junction 100 through resistor 106, and hereupon to inverting input 107 of operational amplifier 109. Operational amplifier 109 will amplify and invert this negative signal with a gain equal to the ratio of resistor 117 over resistor 106. Resistors 90, 96, 98, 117 and 106 have values such that the negative AC waveform signal that passes through amplifier 93 appears at output 110 of operational amplifier 109 with a gain equal exactly to twice that of the negative AC waveform that was directly applied to summing junction 100 through resistor 106. The two negative AC waveform signals appear opposite in polarity at output 110 of operational amplifier 109; their averaged sum appears as a signal equal in both magnitude and polarity to that of the first discussed positive AC waveform. The net effect is to cause a full-wave rectified signal to appear at output 110 of operational amplifier 109. Capacitor 116, however, functions to integrate signals appearing at summing junction 100. The integration time constant is determined by the values of capacitor 116 and the resistors 106 and 98. In the preferred embodiment a time constant of 0.2 seconds is used, thereby causing the averaged integrated output signal appearing at output 43 of AC to DC converter 41 to be virtually a DC signal. The DC signal appearing at output 43 of AC to DC converter 41 is of negative polarity and is directly proportional to the incoming AC signal applied to input 40 of AC to DC amplifier 41, and, therefore, is also directly proportional to the acoustic sound intensity variation.

The DC output of converter 41 is coupled to the input 55 of voltage controlled oscillator and control circuit 56, to the input 45 of noise threshold comparator 46, and to the input 65 of overexposure detection circuit 66. The voltage controlled oscillator and control circuit 56 functions to produce an output pulse signal at its output 57 whose frequency is directly proportional to the level variation of the DC signal applied to its input 55.

Referring to FIG. 4, the basic elements comprising the voltage controlled oscillator and control circuits are: a ramp generator 160, a comparator amplifier 165 and a bilateral switch 130. Electronic switches X1, Y1, X2 and Y2 of bilateral switch 130, are operable to conduct only when enabled. Since switches X1 and X2 are commonly enabled through X1 enable input 133 and X2 enable input 134, they simultaneously conduct when enabled. Similarly, switches Y1 and Y2 are commonly enabled through Y1 enable input 135 and Y2 enable input 136, respectively, and, therefore, simultaneously conduct when enabled. Further, X enable input 129 and Y enable input 128 of bilateral switch 130 are respectively connected to the outputs of the serially connected inverters 176 and 180, respectively, such that the X and Y enable inputs will always be oppositely biased.

For purposes of describing the circuit operation, assuming that the output 167 of comparator amplifier 165 is low; the output 177 of inverter 176 will, therefore, be positive and will provide an enable signal to the X enable input 129 of bilateral switch 130, thereby causing switches X1 and X2 to conduct. As previously described, switches Y1 and Y2 will not conduct since the low output signal from comparator 165 passing through inverters 176 and 180 will not provide an enable signal at the Y enable input 128. The negative DC signal, when applied to input 125 of bilateral switch 130 will flow through switch X1, bilateral switch output 131 and resistor 156 to the inverting input 152 of operational amplifier 153. The non-inverting input 151 of operational amplifier 153, due to its connection through resistor 158 to the output 31 of voltage reference generator 32, will be more positive than the inverting input 152 of operational amplifier 153. Therefore, operational amplifier 153 will integrate and invert the negative DC signal, thereby producing an increasing ramp voltage at its output 155. The rate of change of the voltage output 155 will be a function of the charging current through capacitor 157. This current is also the current through resistor 156, whose value is a direct function of the input voltage appearing at the first bilateral switch output 131. Therefore, the rate of change of the ramp voltage at output 155 of amplifier 153 is directly proportional to the DC voltage at the input 55 of the VCO 56.

The increasing ramp voltage is applied through resistor 162 to the non-inverting input 163 of comparator amplifier 165. Since switch X2 of bilateral switch 130 is conducting, the parallel combination of resistor 173 and 168 combined in series with resistor 170 will determine a first reference voltage for inverting input 164 of comparator amplifier 165. The ramp voltge applied to non-inverting input 163 of comparator amplifier 165 will continue to rise until the voltage at the non-inverting input 163 is greater than at its inverting input 164, whereupon comparator amplifier 165 will switch to a second operating mode providing a positive voltage level at its output 167. Comparator amplifier 165, upon operating in its second mode, causes a negative level to appear at output 177 of inverter 176, thereby causing a positive level to appear at output 181 of inverter 180. Therefore, the enable signal is removed from X enable input 129 of bilateral switch 130 and an enable signal is applied to the Y enable input 128 causing switches Y1 and Y2 of bilateral switch 130 to conduct and causing switches X1 and X2 to not conduct. The foregoing sequence completes one-half of an oscillation cycle.

The second half cycle occurs as follows. Since switch Y1 of bilateral switch 130 is conducting and switch X1 is not conducting, the reference voltage from voltage reference generator 32 will be applied through switch Y1, first bilateral switch output 131, and resistor 156 to the inverting input 152 of operational amplifier 153. Since the reference voltage is positive, operational amplifier 153 will produce at its output 155 a ramp voltage of decreasing slope still determined by capacitor 157 and resistor 156. The decreasing ramp signal will be applied through resistor 162 to the non-inverting input 163 of comparator amplifier 165. Since switch Y2 of bilateral switch 130 is conducting, the reference voltage applied to inverting input 164 of comparator 165 will now be determined by the resistor 173 in combination with the parallel resistors 170 and 168 connected to ground 85. When the ramp voltage has decreased such that the reference voltage at the inverting input 164 of comparator amplifier 165 is greater than the ramp voltage at its non-inverting input 163, comparator amplifier 165 will once again become operational in its first mode, thereby producing a low output level at its output 167. The low output level will cause inverter 176 to apply an enable signal to the X enable 129 of bilateral switch 130, thereby completing one full oscillation cycle. The characteristic shape of the output signal of the voltage controlled oscillator and control circuit 56 is determined by the comparator as it switches from its first mode to its second mode, and is therefore an oscillating pulse frequency signal. The free running oscillation frequency of the voltage controlled oscillator is determined by the design of the ramp generator 160, as will be described later. The frequency of the output pulse signal of the voltage controlled oscillator and control circuit 56 is directly proportional to amplitude variation of the incoming DC signal, and is, therefore, also directly proportional to the acoustic sound.

The pulse signal is applied to the input 50 of NAND gate 49. The noise threshold comparator 49. The noise threshold comparator 46 provides a gating enable signal to the gate input 48 of 49 whenever the magnitude of the negative DC level applied to its input 45 represents an acoustic sound whose intensity is greater than 90 dBA. The gate 49, therefore, passes the pulse signal to pulse counter 62 whenever the acoustic sound to which the person carrying the PIND 10 is exposed exceeds 90 dBA. Pulse counter 62 accumulates a binary count of the pulses received from the gate 49. This count may be read out by means of the accumulated binary count outputs 71 at any time and, is not destroyed until a reset command is applied to the reset input 63 of pulse counter 62. The pulse signal is also made available at a sync frequency output 70 through buffer circuit 60.

An overexposure detection circuit 66 also monitors the negative DC level and produces an overexposure latch signal at its overexposure signal output 73 whenever the monitored DC level continuously attains a magnitude representative of a measured noise intensity of 115 dBA for a period of 1 second. In the preferred embodiment the binary pulse counter 62 and the overexposure detection circuits 66 are simultaneously cleared by a single reset command initiated in the read/calibrate structure 20.

Although the weighted amplifier employed by the preferred embodiment is designed for an A weighted frequency response, it should be understood that the weighted amplifier can be designed for any functional frequency response including the B weighted and C weighted responses without departing from the spirit or intent of this invention. Further, it should be understood that although the preferred embodiment employs Complementary MOS bilateral switching means, any comparable bilateral switch can be employed. Further, the 90 dBA and 115 dBA threshold limits set for the noise threshold comparator and the overexposure detection circuits respectively were selected to comply with the requirements of the Walsh-Healey Act, and could be designed for any other desired levels.

A visual readout of the binary count sored in the pulse counter 62 of the PIND 10 and of the overexposure latch signal of the overexposure detection circuit 66 is provided when the PIND housing 11 is inserted into the recessed cavity 80 of the read/calibrate structure 20 such that the male connectors 75 of the read/calibrate structure mate with the cooperating female connectors formed in the face 15 of the PIND housing 11.

Referring to FIG. 5, the functional read/calibrate structure 20 elements that provide for a transfer of the accumulated binary pulse count are: timing clock 231, divider 244, J-K flip-flops A, B, C and D, temporary pulse storage circuit 211, and binary coded decimal counter 221. In normal operation, timing clock 231 oscillates at a given frequency. The output clock frequency from timing clock 231 is divided by divider 244 to produce a plurality of clock output frequencies at the outputs 246, 247, 248 and 249. A clock pulse appearing at output 248 of divider circuit 244 toggles flip-flop A through its toggle input 197. The binary zero output 194 and the binary one output 195 of flip-flop A, thereby change their states and respectively enable the set zero input 192 and the set one input 193 of flip-flop B. When the PIND housing 11 and the read/calibrate structures are connected as described above, conduction occurs from sync frequency output 70 of PIND 10 to the sync frequency input 82 of read/calibrate structure 20. The first pulse appearing at sync frequency input 82 toggles flip-flop B through its toggle input 190. In the absence of a sync pulse to the sync frequency input 82 the fourth divider output 249 will clock flip-flop B through the multiplexer resistors 185 and 186. The binary zero output 191 of flip-flop B therefore appears in a one state, and resets the binary coded decimal counter 221 through reset input 226 and further triggers the preset enable input 215 of temporary pulse storage means 211. The preset signal applied to preset enable input 215 causes the accumulated binary count of pulse counter 62 of the PIND 10 to be transferred by means of the accumulated binary count outputs 71, connector 75 and its cooperative PIND connector, and binary count inputs 81 to the binary counter elements 212, 213 and 214 of temporary pulse storage circuit 211.

The set zero input 198 of flip-flop C is also enabled by the binary zero output 191 of flip-flop B. Flip-flop C is similarly toggled through its toggle input 199 by the next sync pulse at sync frequency input 82 or by the fourth divider output 249 in the absence of a sync pulse, therby causing its binary zero output 201 to appear in the one state enabling the set zero input 202 of flip-flop D. Flip-flop D is toggled through its toggle input 206 by a clock pulse from the timing clock 231. Thereupon, the binary zero output 204 of flip-flop D resets flip-flop C. The binary one output 205 of flip-flop D removes the clock inhibit signal at the clock enable input 220 of binary coded decimal counter 221 and creates a clock enable signal at the clock inhibit input 210 of the serially connected binary counters of the temporary pulse storage circuit 211. The binary counters 212, 213 and 214 of temporary pulse storage circuit 211 are now clocked down from the transferred accumulated binary count number by a clock signal from timing clock 231 applied to clock input 216 of temporary pulse storage circuit 211. The binary coded decimal counter 221 is simultaneously clocked up by the clocking signal provided by timing clock 231 applied to clock input 227 of binary coded decimal counter 221.

When the binary count of temporary pulse storage circuit 211 reaches zero a carry over command is generated at carry over command output 217 of temporary pulse count storage circuit 211 and is inverted by inverter 218 and fed back the reset input 203 of flip-flop D, thereby causing flip-flop D to reset, and providing at the binary one output 205 of flip-flop D a clock inhibit signal to the clock inhibit input 210 of temporary pulse storage circuit 211 and removing the clock enable signal from the clock enable input 220 of binary coded decimal counter 221. The number now stored in the binary coded decimal counter 221 is the same number that was preset in the binary counters of the temporary pulse storage circuit 211 and, therefore, is the same number as was accumulated by the pulse counter 62 of PIND 10.

It should also be noted that the above described pulse count transfer was a non-volatile transfer that did not destroy the accumulated pulse count of the PIND binary pulse counter 62.

The mechanics of serial binary counting are well-known in the art and will now be described herein. Therefore, a binary to binary coded decimal conversion has been accomplished. Since the plurality of binary coded decimal outputs 228 are connected to the plurality of inputs 235 of visual display panel 236 the binary coded decimal count accumulated in binary coded decimal counter 221 is continuously displayed on the visual display panel 236. The visual readout provided by the Numitron digital character display 237 of the visual display panel 236 is designed such that a reading of 100.0 represents a maximum 100 percent permissible exposure reading.

The ramp generator 160 of voltage controlled oscillator and control circuit 56 is designed such that the visual display panel will read 100.0 when a known acoustic noise level is applied to the receiver 12 for its maximum allowable time as specified by the Walsh-Healey Act, Table I. For example, the voltage controlled oscillator in the preferred embodiment must be designed such that (referring to Table I) a noise level of 105 dBA applied to the receiver 12 for exactly 60 minutes will result in a visual display reading of 100.00.

Although three binary counter stages are used in the preferred embodiment, it will be understood that any number of stages may be used, without departing from the spirit or intent of this invention; the actual number of binary stages used is a function of the voltage controlled oscillator frequency and of the accuracy required. Further, while the present invention shows four binary coded decimal counter stages, it will be understood that any number of binary coded decimal counter stages may be used; the actual number of stages used depends upon the number of digital output characters and the accuracy required.

To obtain the accuracy required by the Walsh-Healey Act, it is necessary to check the calibration of the PIND 10 before and after each 8 hour shift. When the PIND 10 and the read/calibrate structure 20 are connected as previously described, and when the receiver 12 is inserted into recessed cavity 17, calibration of the PIND 10 can be checked as hereafter described. When selector switch knob 18 points to Reset and, therefore, movable contact 278' of selector switch 280 is in contact with stationary contact 275, and when movable contact 285 of push button reset switch 283 is depressed, a ground voltage 85 is applied through reset output 84 of read/calibrate structure 20 to reset input 72 of PIND 10. The ground voltage 85 resets pulse counter 62 and the overexposure detection circuit 66. When selector switch knob 18 is pointed to the calibrate position and, therefore, movable contact 278 of selector switch 280 is placed in contact with stationary contact 274, and when movable contact 272 of push button calibrate switch 271 is depressed, the positive voltage 281 resets flip-flop E through its reset input 251. The binary zero output of flip-flop E thereupon provides a reset signal to reset input 245 of divider circuit 244 which resets a portion of divider circuit 244 so as to provide a clock pulse output at its second output 247 after one minute. The binary one output 253 of flip-flop E enables the set zero input 256 and the set one input 255 of flip-flop F, thereby allowing flip-flop F to be toggled through its toggle input 257 at a one kilohertz rate from the first output 246 of divider circuit 244. The one kilo-hertz output of flip-flop F is integrated by amplifier 261 to provide an approximate sine wave, thereby driving and causing the speaker 265 to produce a 115 dBA one kilohertz tone that is received by the microphone input 21 of receiver 12. The drive signal is provided to microphone source 265 until flip-flop E is toggled through its toggle input 250 by a clock pulse from second output 247 of divider circuit 244 after one minute. Referring to Table I, since the PIND is designed to provide a maximum exposure readout of the visual display 236 of the read/calibrate structure 20 of 100.0 when it measures a sound level of 115 dBA for 15 minutes, a visual readout of 1/15 of 100.0, or 6.7, should be displayed after measurement of the calibrated 115 db level for one minute.

Although the preferred embodiment uses a 115 dBA cali-bration signal for a period of one minute, it is understood that any appropriate combination of sound level drive and period of time may be used to provide a usable calibration signal. Although not shown, additional calibrate options available in the preferred embodiment allow the speaker 265 to be driven for calibration of the 90 dBA and for the >115 dBA levels.

When the PIND 10 and the read/calibrate structure 20 are connected as previously described, the output latching signal from overexposure detection circuit 66, if present, is automatically transferred to the overexposure input 83, thereby causing light emitting diode 267 to be activated if an overexposure condition as previously described has occurred.

While a specific embodiment of this invention has been disclosed, it is to be understood that this is for the purpose of illustration only, and that my invention is to be limited solely by the scope of the appended claims.

We claim:

1. An acoustic noise exposure measuring apparatus comprising:
   A. personal integrating noise dosimeter (PIND) means adapted to be worn or carried on a person for measuring multiple noise exposure, comprising:
      1. means for continuously receiving and converting acoustic sound intensity applied thereto into a pulse train signal whose frequency varies directly with the magnitude of said sound intensity, comprising:
         a. receiver means for converting said acoustic sound intensity into an AC electrical signal which varies directly with said sound intensity;
         b. amplifier weighting means connected to receive said AC signal for amplifying said AC signal according to a predetermined frequency weighted response;
         c. AC to DC converter means connected to receive said weighted AC signal for converting said weighted AC signal to an averaged DC signal directly proportional to said sound intensity, comprising:
            i. first amplifier means connected to receive negative waveforms of said weighted AC signal for amplifying and inverting the polarity of said negative waveforms;
            ii. second amplifier means connected to receive said weighted AC signal for equally amplifying both positive and negative waveforms of said weighted AC signal, the amplification of said second amplifier means being half that of said first amplifier means;
            iii. means operatively connected to said first and second amplifier means for summing said amplified signals from said first and second amplifier means; and
            iv. means operatively connected to receive said summed signal for integrating the summed signal to produce said averaged DC signal, wherein the integrated signal represents said amplified signals from the first and second amplifier means averaged in relation to a predetermined time constant;

d. a voltage controlled oscillator; and e. control means connected to receive said averaged DC signal for controlling said oscillator, wherein said oscillator produces said output pulse train signal whose frequency varies directly with said averaged DC signal;

2. electronic counter means connected to monitor said pulse train signal for accumulating pulse count thereof; and 3. first coupling means connected to receive said accumulated pulse count from said counter means; and B. read/calibrate apparatus operatively detachable from and adapted for servicing at least one of said PIND means, comprising:

1. second coupling means operatively adapted to be detachably coupled to said first coupling means for receiving an indication of said accumulated pulse count therefrom when so coupled; and 2. display storage means connected with said second coupling means for receiving said accumulated pulse count indication therefrom and for producing a visual display indicative thereof.

2. An acoustic noise exposure measuring apparatus comprising:

A. personal integrating noise dosimeter (PIND) means adapted to be worn or carried on a person for measuring multiple noise exposure, comprising:

1. means for continuously receiving and converting acoustic sound intensity applied thereto into a pulse train whose frequency varies directly with the magnitude of said sound intensity, comprising:

a. receiver means for converting said acoustic sound intensity into an AC electrical signal which varies directly with said sound intensity;

b. amplifier weighting means connected to receive said AC signal for amplifying said AC signal according to a predetermined frequency weighted response;

c. AC to DC converter means connected to receive said weighted AC signal for converting said weighted AC signal to an averaged DC signal directly proportional to said sound intensity; and d. voltage controlled oscillator means connected to receive said DC signal for producing said pulse train whose frequency varies directly with said averaged DC signal, comprising:

i. a ramp generator having an input and an output, for producing at its output a voltage signal of increasing predetermined slope when said averaged DC signal is applied to its input, and for producing at its output a voltage signal of decreasing predetermined slope when a reference signal is applied to its input;

ii. comparator means having a signal input, a reference input, and an output for comparing magnitudes of voltage signals applied to its inputs and for producing first and second comparator output signals in response thereto, said comparator means being operable in a first mode to produce said first comparator output signal whenever the voltage at its reference input exceeds the voltage at its signal input, and operable in a second mode to produce said second comparator output signal whenever the voltage at its signal input exceeds the voltage at its reference input, wherein said first and second comparator output signals comprise said pulse train of the voltage controlled oscillator means;

iii. means for operatively connecting said signal input of the comparator means to said output of the ramp generator;

iv. means for providing first and second reference signals;

v. bilateral switching means having control inputs and connected to receive said DC signal and said first and second reference signals for selectively applying these signals to said ramp generator input and to the reference input of said comparator means, said bilateral switching means operable in one state to apply respectively said DC signal to said input of the ramp generator and said first reference signal to the reference input of said comparator means, and operable in a second state to apply respectively said first reference signal to the input of said ramp generator and said second reference signal to the reference input of said comparator means; and vi. circuit means for connecting the output of said comparator means to said control inputs of the bilateral switching means, to cause said bilateral switching means to become operable in its first state when said comparator means is in its first mode, and to cause said bilateral switching means to become operable in its second state when said comparator means is in its second mode;

2. electronic counter means connected to monitor said pulse train for accumulating a pulse count thereof; and 3. first coupling means connected to receive said accumulated pulse count from said counter means; and B. read/calibrate apparatus operatively detachable from and adapted for servicing at least one of said PIND means, comprising:

1. sound coupling means operatively adapted to be detachably coupled to said first coupling means for receiving an indication of said accumulated pulse count therefrom when so coupled; and 2. display storage means connected with said second coupling means for receiving said accumulated pulse count indication therefrom and for producing a visual display indicative thereof.

* * * * *

UNITED STATES PATENT OFFICE
CERTIFICATE OF CORRECTION

Patent No. 3,802,535      Dated April 9, 1974

Inventor(s) Ernest R. Peake & Orrin H. Grangaard

It is certified that error appears in the above-identified patent and that said Letters Patent are hereby corrected as shown below:

Column 19, line 10, after the word "accumulating" there should be the word --a--.

Column 20, line 56, the word "sound" should be --second--.

Signed and sealed this 13th day of August 1974.

(SEAL)
Attest:

McCOY M. GIBSON, JR.
Attesting Officer

C. MARSHALL DANN
Commissioner of Patents